Figure 1:
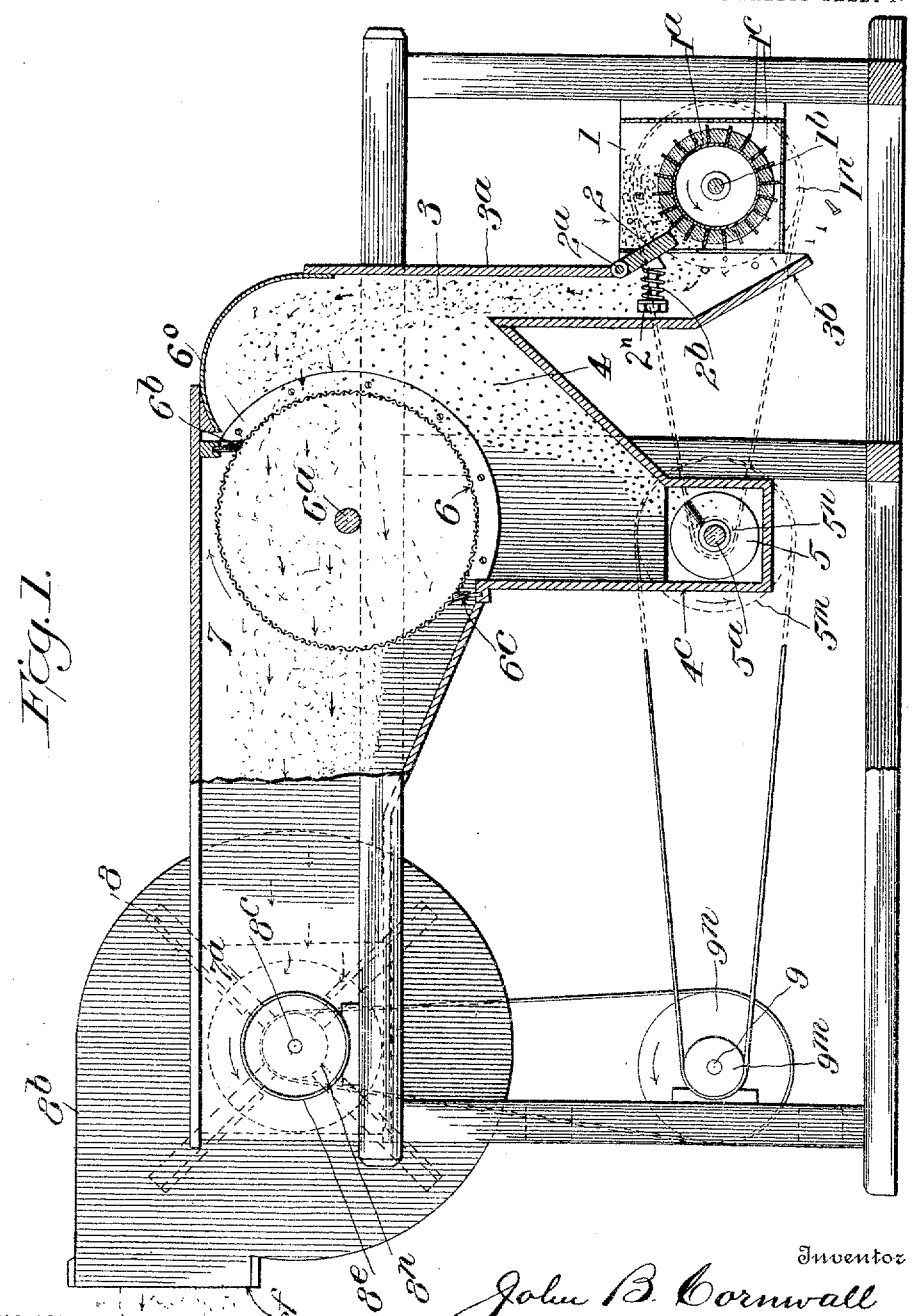

J. B. CORNWALL.
COTTON SEED CLEANING MACHINE.
APPLICATION FILED OCT. 19, 1910.

989,233.

Patented Apr. 11, 1911.

2 SHEETS—SHEET 1.

Witnesses
Ch. Walker
James R. Mansfield

Inventor
John B. Cornwall

By Alexander & Dowell
Attorneys

J. B. CORNWALL.
COTTON SEED CLEANING MACHINE.
APPLICATION FILED OCT. 19, 1910.
989,233.
Patented Apr. 11, 1911.
2 SHEETS—SHEET 2.
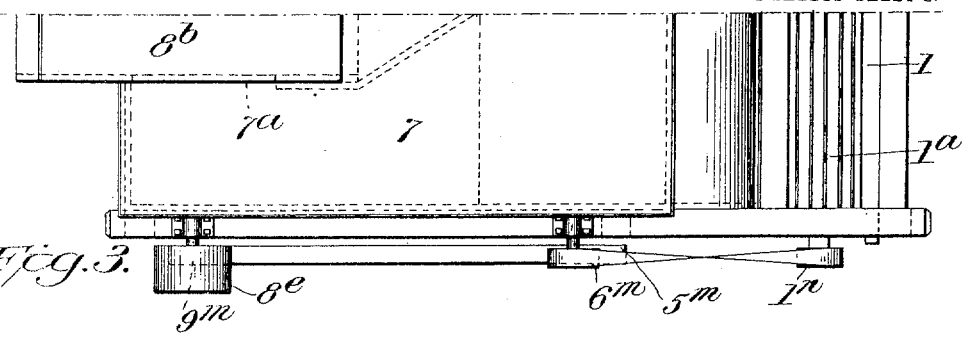
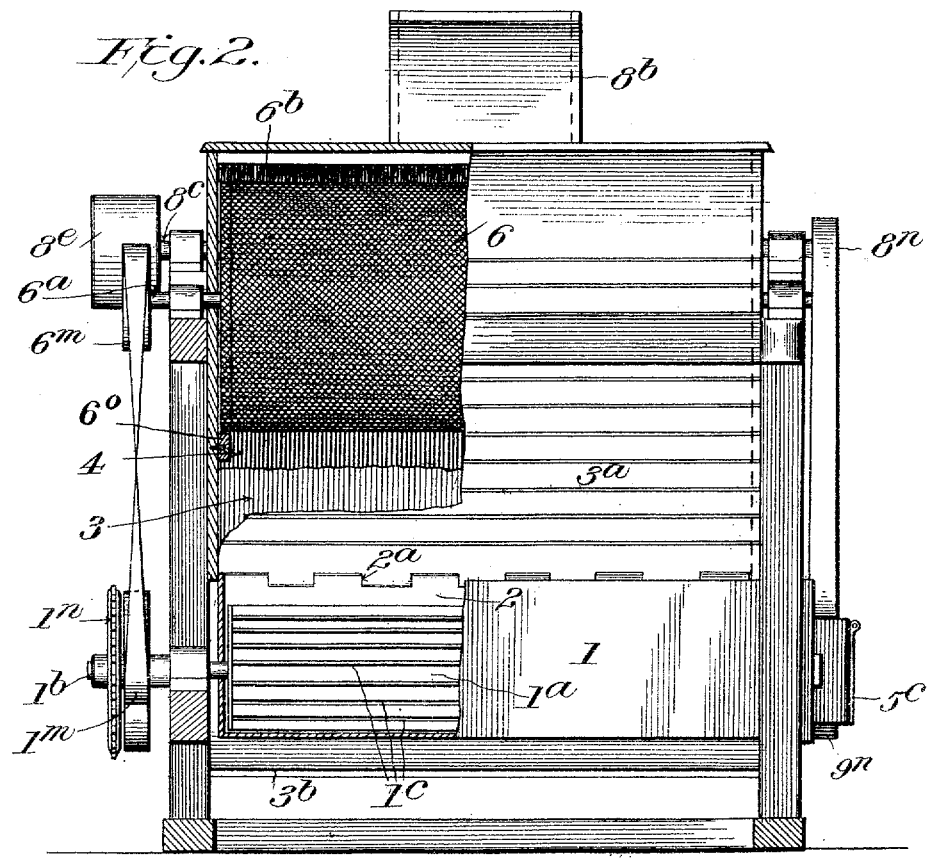

UNITED STATES PATENT OFFICE.

JOHN B. CORNWALL, OF MOLINE, ILLINOIS, ASSIGNOR TO THE BARNARD AND LEAS MANUFACTURING COMPANY, OF MOLINE, ILLINOIS.

COTTON-SEED-CLEANING MACHINE.

989,233.   Specification of Letters Patent.   Patented Apr. 11, 1911.

Application filed October 19, 1910.   Serial No. 587,889.

*To all whom it may concern:*

Be it known that I, JOHN B. CORNWALL, of Moline, in the county of Rock Island and State of Illinois, have invented certain new and useful Improvements in Cotton-Seed-Cleaning Machines; and I hereby declare that the following is a full, clear, and exact description thereof, reference being had to the accompanying drawings, which form part of this specification.

This invention is a novel grain and seed cleaning machine, especially designed for cleaning cotton seed, and its object is to separate therefrom all such small particles and dust as will pass through the screen or baffle, and also to separate the seed from the heavier foreign matter, such as particles of metal, lumps of clay, pieces of stone, etc., by aspiration or air currents.

The machine in brief comprises a hopper for feeding the seed into the lower end of a vertical air trunk at the upper end of which is a large settling chamber which communicates with a large air passage leading to a fan chamber. Interposed between the said passage and upper end of the settling chamber is a rotary screen or baffle which is employed to separate the dust from the seed, the air being drawn through the baffle so that any dust particles that enter the baffle at one side will be drawn out of the baffle on the opposite side with as much force as they enter therein, the fan being beyond the baffle instead of in front of it.

At the bottom of the settling chamber is a discharge screw or conveyer. The cotton seed is fed into the lower end of the air trunk by a feeder that will cause the seeds to enter the machine but prevent a blast of air entering therewith; but air enters the trunk below the seed and strikes the seed as it is delivered from the feeder, and carries the seed up into the settling chamber wherein they are arrested by the baffle and drop by gravity to the conveyer, and are discharged from the machine thereby; while the dust and small foreign matters pass through the baffle and are blown out by the fan. The heavier matters, such as stones, pieces of metal, etc., drop out of the lower end of the air trunk below the feeder.

In this invention I employ air to lift the entire valuable portion of the seeds or grain into the settling chamber, instead of lifting only the lighter refuse, as has been the case and practice in prior separating machines in which air has been used for cleaning grain, and my machines are efficient substitutes for such machines as are operated by electro-magnets for catching iron particles, etc. I not only take the grain in at the bottom of the vertical air trunk but carry it upward from that point, instead of allowing it to drop out of the trunk, as is done in all other air separating machines of which I am aware. I also discharge the clean grain from the machine at the point where the refuse is usually discharged. I employ a roll or cylinder feeder so arranged that it excludes the air from passing into the machine with the stream of material, and this feeder also forms part of one side of the air passage, where the air enters the machine. The stream of air enters the machine at the most effective point, that is under and through the stream of grain, nothing intervening. The lower end of this air trunk is preferably deflected so as to cause the passage for the air to practically curve around the lower side of the feeding cylinder.

I will now describe the invention in detail as embodied in the machine shown in the accompanying drawings in which—

Figure 1 is a sectional side elevation of the complete machine. Fig. 2 is a sectional end elevation thereof. Fig. 3 is a detail plan view of part of such machine.

In the drawings 1 designates a feed hopper in which is a rotary feed cylinder $1^a$ mounted on a shaft $1^b$, and preferably provided with radial peripheral ribs $1^c$ the spaces between adjacent ribs forming channels angular in cross section which are adapted to receive the cotton seed and feed same past the regulating valve 2, which is hinged at its upper edge, as at $2^a$, to the lower edge of the outer wall $3^a$ of the vertical air trunk 3. The valve 2 is yieldingly pressed inward toward the cylinder $1^a$ by a spring $2^b$, interposed between valve 2 and a bar or bracket $2^n$ as indicated in Fig. 1, so as to keep the valve 2 practically in close contact with the cylinder 1, and thus prevent air entering the air trunk with the seed. The valve and cylinder practically form part of the outer wall of the air trunk at the lower end thereof, and the inner wall of the air trunk adjacent the cylinder is inclined outwardly as shown at $3^b$, so that air entering the trunk must pass under and partly around the cylinder, so as to directly strike the seed fed into the trunk by the cylinder.

The air enters with such force and in such volume that it will carry the seed up through the air trunk into the settling chamber 4 above the air trunk and communicating with the upper end thereof, but nails, gravel and other like heavy foreign substances will be discharged by gravity at the lower end of the air trunk beneath the feed cylinder, as indicated in the drawings.

The settling chamber 4 communicates with a horizontal air passage 7, which preferably conducts air to the eyes $7^a$ of a fan chamber $8^b$ in which is a rotary fan 8 mounted on a shaft $8^c$, which is also the drive shaft of the machine, and is provided with a pulley $8^e$ which may be belted to any suitable source of power. The outlet $8^f$ of the fan may be connected with any suitable discharge pipe—not shown—if desired to conduct the dust away from the machine.

Interposed between the settling chamber 4 and the air passage 7 is a rotary baffle, which consists of a cylindrical screen 6 mounted on a shaft $6^a$ journaled in the side walls of the machine, said baffle being preferably made of wire-mesh of sufficient fineness to prevent the passage of the seed therethrough while permitting the passage of dust and fine foreign particles carried up with the seed.

It will be observed that the dust laden air enters into the baffle at the side adjacent chamber 4 and passes therethrough and emerges therefrom at the side adjacent the passage 7, as indicated by the arrows in the drawings. Air is prevented from passing around the baffle by means of stationary baffles $6^b$, $6^c$ located at the sides thereof, and at the top and bottom of the inlet passage 7, as shown in the drawings, or in such other positions as will prevent seed passing from chamber 4 into passage 7 around the revolving baffle. The stationary baffles $6^c$, $6^b$ may be in the form of valves provided with flexible edges or brushes, which will maintain close contact with the surface of the revolving baffle 6 and prevent any short circuiting of the air around the baffle, between chamber 4 and passage 7.

Below the baffle 6 chamber 4 has a hopper bottom terminating in a trough $4^c$ in which is located a screw conveyer 5 mounted on a shaft $5^a$, and said conveyer is adapted to discharge the seed deposited in chamber 4 at one side of the machine. The discharge outlet of conveyer 5 is closed by a suitable valve $5^c$ which is adapted to prevent inlet of air but will allow seed to escape when forced therepast. Valves of this kind are well known and can be used for this purpose, and I have not therefore illustrated any particular form of such valve.

The various operative parts may be driven from the main fan shaft $8^c$. As indicated in the drawings a pulley $8^n$ on shaft $8^c$ is belted to a pulley $9^n$ on countershaft 9 on which is a smaller pulley $9^m$ which is belted to a larger pulley $5^m$ on the conveyer shaft $5^a$, on which is a smaller pulley $5^n$ which is belted to a pulley $1^n$ on the feeder shaft $1^b$, on which latter shaft is a smaller pulley $1^m$ belted to a pulley $6^m$ on the rotary baffle shaft $6^a$. The belt driving the baffle shaft is preferably crossed, as shown, so as to drive the baffle clock-wise and cause it to naturally tend to deflect the seed downward to the discharge conveyer.

To prevent any material passing around the ends of the revolving baffle from chamber 4 into passage 7, I attach curved baffle plates $6^o$ to the ends of chamber 4 adjacent the ends of the rotary baffle 6 and between the stationary baffles $6^b$, $6^c$, see Figs. 1 and 2. These baffles $6^o$ prevent material passing around the ends of the baffle; but anything that may have passed into the rotary baffle from chamber 4 and have accumulated on the inside of the baffle 6 can escape therefrom into the passage 7 at the ends of the baffle between the baffles $6^c$, $6^b$, thereby preventing any clogging of the baffle 6.

What I claim is:

1. In a cotton seed cleaning machine the combination of a fan chamber, an air passage communicating therewith, a settling chamber communicating with the air passage, a rotary baffle or screen interposed between the air passage and settling chamber, yielding baffles beside the rotary baffle to prevent seed passing around the baffle, and means in the bottom of the settling chamber to discharge clean seed therefrom; with a vertical air trunk communicating with the settling chamber at the side opposite the fan, a feed hopper beside the lower end of the air trunk, a rotary feed cylinder in said hopper forming part of the outer wall of the trunk at the lower end thereof, and having longitudinal channels in its periphery angular in cross section and adapted to receive and feed cotton seed into the trunk, a valve coöperating with said cylinder to permit entrance of seed into the trunk and prevent air entering the trunk with the seed, the lower end of the inner wall of the air trunk being bent toward the cylinder, the air entering under the cylinder and the seed being lifted by the upward air blast through the trunk into the settling chamber and deposited therein, while the heavier foreign particles are discharged from the trunk by gravity and the lighter particles and dust are drawn through the baffle and discharged by the fan.

2. In a grain separating apparatus, the combination of a separating chamber, means for producing a draft of air therethrough, a revolving screen at the outlet side of the separating chamber, said screen forming both a baffle and an air filter, and stationary yieldable baffles interposed between the sides of the screen and the adjacent walls of the chamber and adapted to continuously impinge upon the periphery of the revolving screen to prevent dust laden air and impurities passing around said screen, and baffles at the ends of the screen at the side thereof next the feed hopper; with an air trunk communicating with the settling chamber at the side of the baffle opposite the fan, and a feed hopper, a feed roller delivering seed from the hopper into the said trunk above the air inlet, the seed being lifted by the suction blast created by the fan into said separating chamber, and deposited therein, while the dust laden air is drawn through the baffle to the fan.

In testimony that I claim the foregoing as my own, I affix my signature in presence of two witnesses.

JOHN B. CORNWALL.

Witnesses:
BRUCE S. POLLARD,
JULIUS A. GERWEN.

Copies of this patent may be obtained for five cents each, by addressing the "Commissioner of Patents, Washington, D. C."